US011391644B2

United States Patent
Nakamura et al.

(12) United States Patent
(10) Patent No.: US 11,391,644 B2
(45) Date of Patent: Jul. 19, 2022

(54) OPTICAL FIBER TESTING METHOD AND OPTICAL FIBER TESTING DEVICE

(71) Applicant: NIPPON TELEGRAPH AND TELEPHONE CORPORATION, Tokyo (JP)

(72) Inventors: Atsushi Nakamura, Musashino (JP); Keiji Okamoto, Musashino (JP); Hiroyuki Oshida, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/283,597

(22) PCT Filed: Jun. 13, 2019

(86) PCT No.: PCT/JP2019/023569
§ 371 (c)(1),
(2) Date: Apr. 8, 2021

(87) PCT Pub. No.: WO2020/075343
PCT Pub. Date: Apr. 16, 2020

(65) Prior Publication Data
US 2021/0381926 A1    Dec. 9, 2021

(30) Foreign Application Priority Data

Oct. 12, 2018   (JP) .............................. JP2018-193530

(51) Int. Cl.
*G01M 11/00*     (2006.01)
(52) U.S. Cl.
CPC .... *G01M 11/3109* (2013.01); *G01M 11/3145* (2013.01)

(58) Field of Classification Search
CPC .. G01M 11/30; G01M 11/31; G01M 11/3109; G01M 11/3118; G01M 11/3127;
(Continued)

(56) References Cited

U.S. PATENT DOCUMENTS 5,077,815 A * 12/1991 Yoshizawa ............... G02B 6/14
385/28
10,845,268 B1 * 11/2020 O'Sullivan ........ G01M 11/3109

FOREIGN PATENT DOCUMENTS

| JP | 2016099166 A | * | 5/2016 |
| JP | 2017003338 A | * | 1/2017 |
| JP | 2017026474 A | * | 2/2017 |

OTHER PUBLICATIONS

Masato Yoshida et al., Mode coupling measurement at a splice point between few-mode fibers using a synchronous multi-channel OTDR, OFC2016, 2016.

(Continued)

*Primary Examiner* — Gordon J Stock, Jr.

(57) ABSTRACT

The present invention has an object to provide an optical fiber test method and an optical fiber test apparatus for measuring a mode dependent loss and an inter-modal crosstalk in a fundamental mode and a first higher-order mode at a connection point of a few-mode fiber. In the optical fiber test method and test apparatus according to the present invention, the mode dependent loss and the inter-modal crosstalk in the fundamental mode and the first higher-order mode at the connection point are calculated by using an approximation expression of an inter-modal coupling efficiency that is obtained in approximating electric field distributions of the fundamental mode and the first higher-order mode in a few-mode fiber by Gaussian function and Hermite Gaussian function.

6 Claims, 2 Drawing Sheets

(58) Field of Classification Search
CPC ......... G01M 11/3136; G01M 11/3145; G01M 11/3154; G01M 11/3163; G01M 11/3172; G01M 11/3181; G01M 11/319
See application file for complete search history.

(56) References Cited

OTHER PUBLICATIONS

Atsushi Nakamura et al., Effective mode field diameter for LP11 mode and its measurement technique, IEEE Photon. Technol. Lett, vol. 28, No. 22, 2016, pp. 2553-2556.

* cited by examiner

OPTICAL FIBER TESTING METHOD AND OPTICAL FIBER TESTING DEVICE

CROSS-REFERENCE TO RELATED APPLICATIONS

This application is a 371 U.S. National Phase of International Application No. PCT/JP2019/023569 filed on Jun. 13, 2019, which claims priority to Japanese Application No. 2018-193530 filed on Oct. 12, 2018. The entire disclosures of the above applications are incorporated herein by reference.

TECHNICAL FIELD

The present disclosure relates to a test method and a test apparatus for measuring a mode dependent loss and an inter-modal crosstalk in a few-mode optical fiber.

BACKGROUND ART

With the increase in large-volume content such as movies and games, and the spread of smartphones, traffic amounts in optical fiber networks have been increasing every year. On the other hand, transmission capacity of single mode fiber that is currently used as a transmission medium is approaching its limit. As one technique for addressing future traffic increases, mode multiplexing transmission using a few-mode fiber has been focused on. In this technique, a mode dependent loss or an inter-modal crosstalk at a connection point of the few-mode fiber is one of important optical characteristics.

As an optical fiber test method, Optical Time Domain Reflectometry (hereinafter, referred to as OTDR) is renowned. The OTDR is a method and apparatus in which a pulsed test light is incident on an optical fiber under test (hereinafter, referred to as a FUT) to acquire distribution data (OTDR waveforms) based on intensities of a backscattered light of a Rayleigh scattered light originating from the test light pulse propagating within the optical fiber and a Fresnel reflected light, and a round trip time. This technique can be used to test optical properties of optical fibers. Non Patent Literature (NPL) 1 discloses a method for testing inter-modal crosstalk at a connection point of a few-mode fiber using an OTDR having multiple channels.

CITATION LIST

Non Patent Literature

NPL 1: M. Yoshida, et al., "Mode coupling measurement at a splice point between few-mode fibers using a synchronous multi-channel OTDR," OFC2016, Th1J.4, 2016.

NPL 2: A. Nakamura et. al., "Effective mode field diameter for LP11 mode and its measurement technique," IEEE Photon. Technol. Lett., vol. 28, no. 22, pp. 2553-2556, 2016.

SUMMARY OF THE INVENTION

Technical Problem

However, the test method described in NPL 1 does not refer to a method for testing a mode dependent loss at a connection point. The present invention has been made in view of such circumstances, and has an object to provide an optical fiber test method and an optical fiber test apparatus for measuring a mode dependent loss and an inter-modal crosstalk in a fundamental mode and a first higher-order mode at a connection point of a few-mode fiber.

Means for Solving the Problem

In order to achieve the object described above, in the optical fiber test method and test apparatus according to the present invention, a mode dependent loss and an inter-modal crosstalk in a fundamental mode and a first higher-order mode at a connection point are calculated by using an approximation expression of an inter-modal coupling efficiency that is obtained in approximating electric field distributions of the fundamental mode and the first higher-order mode in a few-mode fiber by Gaussian function and Hermite Gaussian function.

Specifically, an optical fiber test method according to the present invention includes a light incident procedure that makes a test light pulse of a wavelength capable of propagating in a fundamental mode and a first higher-order mode be incident, in any one of the fundamental mode or the first higher-order mode, on one end of an optical fiber under test in which a plurality of the same type optical fibers are connected in series, a measurement procedure that measures an intensity distribution for a distance, from the one end, of each of a fundamental mode component and a first higher-order mode component of a return light of the test light pulse made incident in the light incident procedure, a transmittance ratio computation procedure that computes a ratio K of a transmittance of the first higher-order mode component to a transmittance of the fundamental mode component of the return light at the connection point of the optical fiber under test from the intensity distribution measured in the measurement procedure, and a calculation procedure in which by using a first mathematical equation and a second mathematical equation in a mathematical equation for finding a coupling efficiency between respective modes at a connection portion of an optical fiber, based on an electric field distribution of each mode in the optical fiber and an amount of axial displacement at the connection portion, the first mathematical equation being obtained by approximating the electric field distributions of the fundamental mode and the first higher-order mode in the optical fiber by Gaussian function and Hermite Gaussian function, the second mathematical equation being obtained by making simultaneous equations of the mathematical equation for finding transmittances of the respective modes from the coupling efficiency between the respective modes and the first mathematical equation, the ratio K of the transmittances computed in the transmittance ratio computation procedure is substituted into the second mathematical equation to calculate the amount of axial displacement, and the amount of axial displacement is substituted into the first mathematical equation to calculate a coupling efficiency $\eta_{01\text{-}01}$ between the fundamental modes, a coupling efficiency $\eta_{11\text{-}11}$ between the fundamental mode and the first higher-order mode group, and a coupling efficiency between $\eta_{11\text{-}11}$ the first high-order mode groups.

Further, an optical fiber test apparatus according to the present invention includes a light incident section that makes a test light pulse of a wavelength capable of propagating in a fundamental mode and a first higher-order mode be incident, in any one of the fundamental mode or the first higher-order mode, on one end of an optical fiber under test in which a plurality of the same type optical fibers are connected in series, a measurement section that measures an intensity distribution for a distance, from the one end, of each of a fundamental mode component and a first higher-order mode component of a return light of the test light pulse made incident by the light incident section, a transmittance ratio computation section that computes a ratio K of a transmittance of the first higher-order mode component to a transmittance of the fundamental mode component of the return light at the connection point of the optical fiber under test from the intensity distribution measured in the measurement section, and a calculation section in which by using a first mathematical equation and a second mathematical equation in a mathematical equation for finding a coupling efficiency between respective modes at a connection portion of an optical fiber, based on an electric field distribution of each mode in the optical fiber and an amount of axial displacement at the connection portion, the first mathematical equation being obtained by approximating the electric field distributions of the fundamental mode and the first higher-order mode in the optical fiber by Gaussian function and Hermite Gaussian function, the second mathematical equation being obtained by making simultaneous equations of the mathematical equation for finding transmittances of the respective modes from the coupling efficiency between the respective modes and the first mathematical equation, the ratio K of the transmittances computed in the transmittance ratio computation section is substituted into the second mathematical equation to calculate the amount of axial displacement, and the amount of axial displacement is substituted into the first mathematical equation to calculate a coupling efficiency $\eta_{01-01}$ between the fundamental modes, a coupling efficiency $\eta_{01-11}$ between the fundamental mode and the first higher-order mode group, and a coupling efficiency $\eta_{11-11}$ between the first high-order mode groups.

Here, a following Equation (C1) may be used as the second mathematical equation, and a following Equation (C2) may be used as the first mathematical equation,

[Math. C1]

$$\frac{d^2}{w^2} = K - \sqrt{K^2 + 2K - 2} \quad \text{(C1)}$$

[Math. C2]

$$\eta_{01-01} = \exp\left(-\frac{d^2}{w^2}\right) \quad \text{(C2)}$$

$$\eta_{01-11} = \eta_{11-01} = \frac{d^2}{w^2}\exp\left(-\frac{d^2}{w^2}\right)$$

$$\eta_{11-11} = \left(1 - \frac{d^2}{w^2} + \frac{1}{2}\frac{d^4}{w^4}\right)\exp\left(-\frac{d^2}{w^2}\right)$$

where, w represents a mode field diameter of the fundamental mode and the first higher-order mode in the optical fiber under test, and d represents the amount of axial displacement.

In the calculation procedure and the calculation section, further, logarithmic transformation may be performed on the coupling efficiency $\eta_{01-01}$ and the coupling efficiency to calculate a mode dependent loss and logarithmic transformation may be performed on the coupling efficiency $\eta_{01-11}$ to calculate an inter-modal crosstalk.

Effects of the Invention

The present invention can provide an optical fiber test method and an optical fiber test apparatus for measuring a mode dependent loss and an inter-modal crosstalk in a fundamental mode and a first higher-order mode at a connection point of a few-mode fiber.

DESCRIPTION OF EMBODIMENTS

Hereinafter, embodiments of the present invention will be described with reference to the drawings. The embodiments described below are examples of the present invention, and the present invention is not limited to the following embodiments. In this specification and the drawings, constituent elements having the identical reference signs are assumed to be mutually the same.

Figure 1:
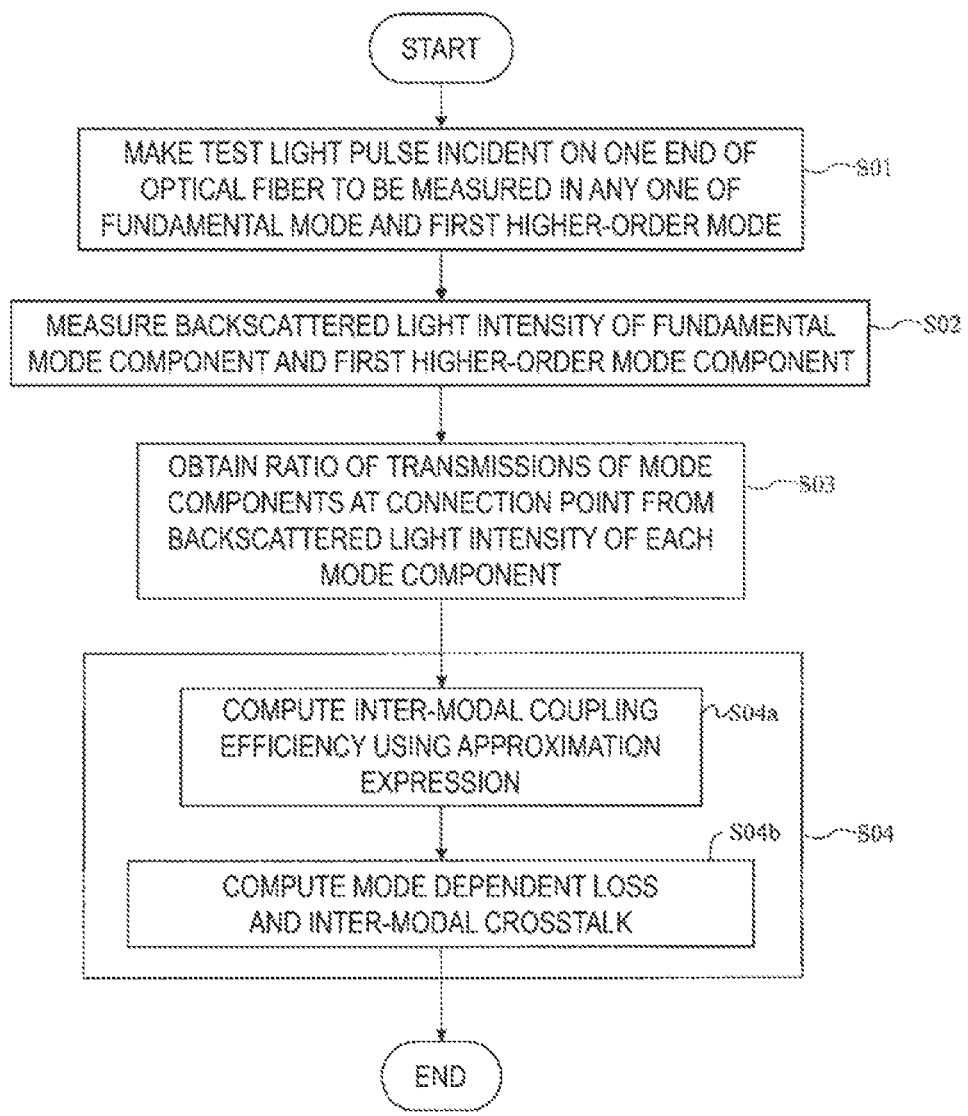
FIG. 1 is a diagram for explaining an optical fiber test method according to the present invention.

FIG. 1 is a process chart for explaining an optical fiber test method according to the present embodiment. The optical fiber test method is characterized by performing a light incident procedure S01, a measurement procedure S02, an acquisition procedure S03, and a calculation procedure S04 described below. The light incident procedure S01 makes a test light pulse of a wavelength capable of propagating in a fundamental mode and a first higher-order mode be incident, in any one of the fundamental mode or the first higher-order mode, on one end of an optical fiber under test in which two of the same type optical fibers are connected in series. The measurement procedure S02 measures an intensity distribution for a distance, from the one end, of each of a fundamental mode component and a first higher-order mode component of a return light of the test light pulse made incident in the light incident procedure S01. The acquisition procedure S03 acquires a ratio K of a transmittance of the first higher-order mode component to a transmittance of the fundamental mode component of the return light at the connection point of the optical fiber under test from the intensity distribution measured in the measurement procedure S02. The calculation procedure S04 substitutes the ratio K of the transmittances obtained in the acquisition procedure into Equation (20) to calculate a value ($d^2/w^2$), substitutes the value ($d^2/w^2$) into Equations (11) to (13) to calculate a coupling efficiency $\eta_{01-01}$ between the fundamental modes, a coupling efficiency $\eta_{01-11}$ between the fundamental mode and a first higher-order mode group, and a coupling efficiency between the first high-order mode groups (step S04a), and further, performs logarithmic transformation on the coupling efficiency $\eta_{01-01}$ and the coupling efficiency $\eta_{11-11}$ to calculate a mode dependent loss and performs logarithmic transformation on the coupling efficiency $\eta_{01-11}$ to calculate an inter-modal crosstalk (step S04b).

The light incident procedure S01 performs:
a generation step of generating a test light pulse of a wavelength capable of propagating through an optical fiber under test in a fundamental mode and a first higher-order mode, and
an light incident step of making the test light pulse generated in the generation step be incident on one end of the optical fiber under test in any one of the fundamental mode or the first higher-order mode.

The measurement procedure S02 performs:

a mode demultiplexing step of dividing a return light of the test light pulse incident on one end of the optical fiber under test in the light incident step into the fundamental mode and the first higher-order mode, and a light intensity acquisition step of photoelectric-converting each of the mode components of the return light divided in the mode demultiplexing step, and acquiring an intensity distribution for a distance, from one end of the optical fiber under test, of each of the mode components of the return light. Specifically, in the light incident procedure S01 and the measurement procedure S02, backscattered light intensity distributions from one end of the optical fiber under test in the fundamental mode and the first higher-order mode are measured using the backscattered light measurement technique as described in NPL 2.

The acquisition procedure S03 performs:

a transmittance ratio acquisition step of acquiring a ratio of transmittances generated in the mode components of the return light at any position of the optical fiber under test from the intensity distribution of each of the mode components of the return light acquired in the light intensity acquisition step.

In the calculation procedure S04 performs:

an inter-modal coupling efficiency computation step (S04a) of computing an inter-modal coupling efficiency at a connection point using an approximation expression from the ratio of the transmittances acquired in the transmittance ratio acquisition step, and a mode dependent loss and inter-modal crosstalk acquisition step (S04b) of acquiring a mode dependent loss and an inter-modal crosstalk from the inter-modal coupling efficiency acquired in the inter-modal coupling efficiency computation step. Details for computing the inter-modal coupling efficiency, the mode dependent loss, and the inter-modal crosstalk will be described later.

Figure 2:
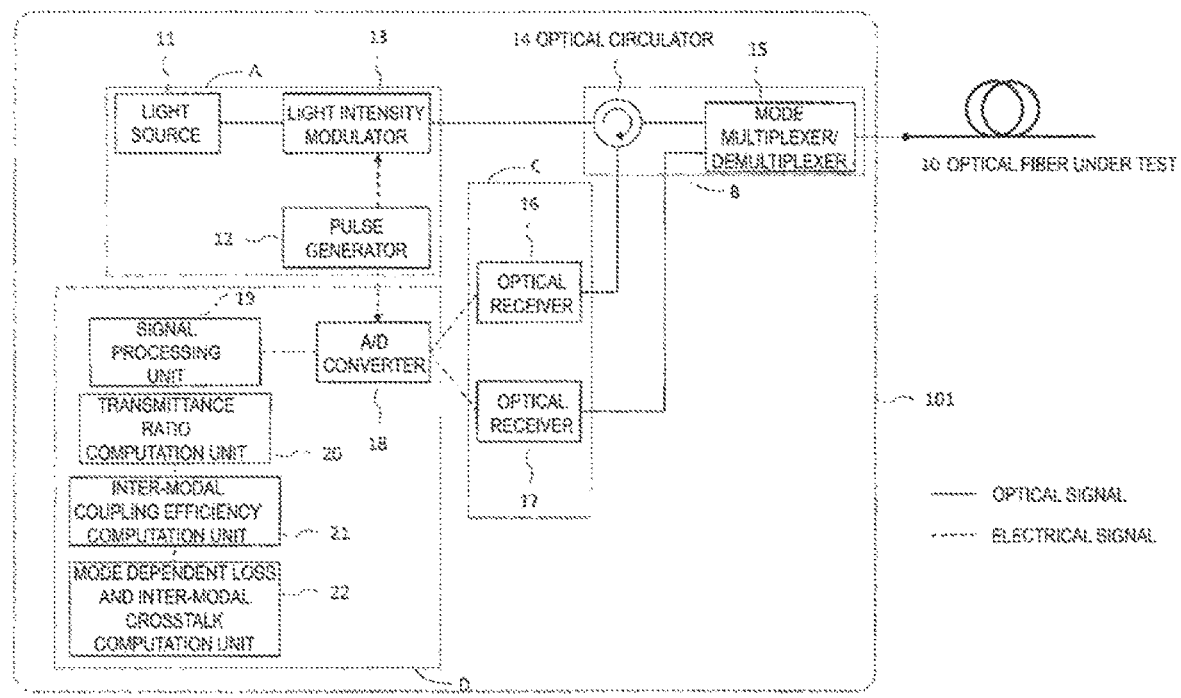
FIG. 2 is a diagram for explaining an optical fiber test apparatus according to the present invention.

FIG. 2 is a diagram for explaining a configuration example of an optical fiber test apparatus 101 according to the present embodiment. The optical fiber test apparatus 101 includes a light incident means, a measurement means, a transmittance ratio computation means, and a calculation means described below. The light incident means makes a test light pulse of a wavelength capable of propagating in a fundamental mode and a first higher-order mode be incident, in any one of the fundamental mode or the first higher-order mode, on one end of an optical fiber under test 10 in which two of the same type optical fibers are connected in series. The measurement means measures an intensity distribution for a distance, from the one end, of each of a fundamental mode component and a first higher-order mode component of a return light of the test light pulse made incident by the light incident means. The transmittance ratio computation means computes a ratio K of a transmittance of the first higher-order mode component to a transmittance of the fundamental mode component of the return light at the connection point of the optical fiber under test 10 from the intensity distribution measured by the measurement means. The computation means substitutes the ratio K of the transmittances computed by the transmittance ratio computation means into Equation (20) to calculate a value $(d^2/w^2)$, substitutes the value $(d^2/w^2)$ into Equations (11) to (13) to calculate a coupling efficiency $\eta_{01-01}$ between the fundamental modes, a coupling efficiency $\eta_{01-11}$ between the fundamental mode and a first higher-order mode group, and a coupling efficiency $\eta_{11-11}$ between the first high-order mode groups, and further, performs logarithmic transformation on the coupling efficiency $\eta_{01-01}$ and the coupling efficiency $\eta_{11-11}$ to calculate a mode dependent loss and performs logarithmic transformation on the coupling efficiency $\eta_{01-11}$ to calculate an inter-modal crosstalk.

The light incident means includes:

a generating unit A generating a test light pulse of a wavelength capable of propagating through an optical fiber under test 10 in a fundamental mode and a first higher-order mode, and a mode multiplexing/demultiplexing unit B making the test light pulse generated by the generating unit A be incident on the optical fiber under test 10 in any one of the fundamental mode or the first higher-order mode, and dividing a return light of the test light pulse into the fundamental mode and the first higher-order mode.

The measurement means includes:

the mode multiplexing/demultiplexing unit B, a light receiving unit C photoelectric-converting each of the mode components of the return light divided by the mode multiplexing/demultiplexing unit B, and a signal processing unit 19, of a calculation processing unit D, acquiring an intensity distribution for a distance, from one end of the optical fiber under test 10, of each of the mode components of the return light, when the test light pulse is made incident on one end of the optical fiber under test 10 in any one of the fundamental mode or the first higher-order mode, based on an output signal from the light receiving unit C and converted into digital data.

The transmittance ratio computation means includes:

a transmittance ratio computation unit 20, of the calculation processing unit D, computing a ratio of transmittances generated at a connection point from the intensity distribution of each of the mode components of the return light.

The calculation means includes, of the calculation processing unit D:

an inter-modal coupling efficiency computation unit 21 computing an inter-modal coupling efficiency from the ratio of the transmittance computed by the transmittance ratio computation unit 20, and a mode dependent loss and inter-modal crosstalk computation unit 22 computing a mode dependent loss and an inter-modal crosstalk from the inter-modal coupling efficiency computed by the inter-modal coupling efficiency computation unit 21.

The generating unit A includes a light source 11, a pulse generator 12, and a light intensity modulator 13. The light source 11 can output a continuous light of a wavelength capable of propagating through the optical fiber under test 10 in the fundamental mode and the first higher-order mode, and the output continuous light is made into a pulse to be a test light pulse by the light intensity modulator 13 in accordance with a signal of the pulse generator 12. The light intensity modulator 13 is an acoustic optical modulator provided with an acoustic optical switch configured to pulse-drive an acoustic optical element, for example. Note that the pulse generator 12 may output a trigger signal to the calculation processing unit D to determine a timing when to start the measurement of the backscattered light intensity distribution.

The mode multiplexing/demultiplexing unit B includes has an optical circulator 14 and a mode multiplexer/demultiplexer 15. The test light pulse generated by the light intensity modulator 13 is incident on the mode multiplexer/demultiplexer 15 via the optical circulator 14. The mode multiplexer/demultiplexer 15 is a mode multiplexer/demultiplexer provided with a directional coupler including a planar lightwave circuit, for example, as described in NPL 2. The test light pulse is incident on one end of the optical fiber under test 10 in any one of the fundamental mode or the first higher-order mode from the mode multiplexer/demultiplexer 15.

When the test light pulse incident in any one of the fundamental mode or the first higher-order mode propagates through the optical fiber under test 10, some of the test light pulses are coupled to those in a fundamental mode and a first higher-order mode propagating in a reverse direction by Rayleigh scattering, and become backscattered lights in the fundamental mode and the first higher-order mode, respectively. The backscattered lights are re-incident on the mode multiplexer/demultiplexer 15 as return light. At this time, the fundamental mode component and first higher-order mode component of the return light are divided by the mode multiplexer/demultiplexer 15.

The light receiving unit C includes two optical receivers (16, 17). Among the return lights divided into each mode by the mode multiplexer/demultiplexer 15, a mode component the same as the incident test light pulse is incident on the optical receiver 16 via the optical circulator 14, and a mode component different from the incident test light pulse is incident on the optical receiver 17, and those incident mode components are subjected to photoelectric conversion.

The calculation processing unit D includes an A/D (analog to digital) converter 18, the signal processing unit 19, the transmittance ratio computation unit 20, the inter-modal coupling efficiency computation unit 21, and the mode dependent loss and inter-modal crosstalk computation unit 22. Electrical signals from the optical receivers 16 and 17 are converted to digital data by the A/D converter 18. The digital data is input to the signal processing unit 19.

The signal processing unit 19 acquires the intensity distribution for the fundamental mode and first higher-order mode components of the return light. Furthermore, the transmittance ratio computation unit 20 acquires the ratio of the transmittances of the fundamental mode and first higher-order mode components of the return light at the connection point in the intensity distribution. Then, the inter-modal coupling efficiency computation unit 21 performs calculation processing for computing the inter-modal coupling efficiency at the connection point. The mode dependent loss and inter-modal crosstalk computation unit 22 performs calculation processing for computing the mode dependent loss and the inter-modal crosstalk from the acquired inter-modal coupling efficiency.

The calculation processing unit D can be realized by a computer and a program, and the program can be recorded on a recording medium or provided through a network.

Hereinafter, the calculation processing for computing the inter-modal coupling efficiency, the mode dependent loss, and the inter-modal crosstalk will be described.

Electric field distributions of the fundamental mode and two orthogonal first higher-order modes in the optical fiber are approximated by the following Gaussian function and Hermite Gaussian function.

[Math. M1]

$$E_1(x, y) = \sqrt{\frac{2}{\pi w^2}} \exp\left(-\frac{x^2 + y^2}{w^2}\right) \quad (1)$$

$$E_2(x, y) = \sqrt{\frac{2}{\pi}} \frac{2}{w^2} x \exp\left(-\frac{x^2 + y^2}{w^2}\right) \quad (2)$$

$$E_3(x, y) = \sqrt{\frac{2}{\pi}} \frac{2}{w^2} y \exp\left(-\frac{x^2 + y^2}{w^2}\right) \quad (3)$$

(M1)

Figure 3:
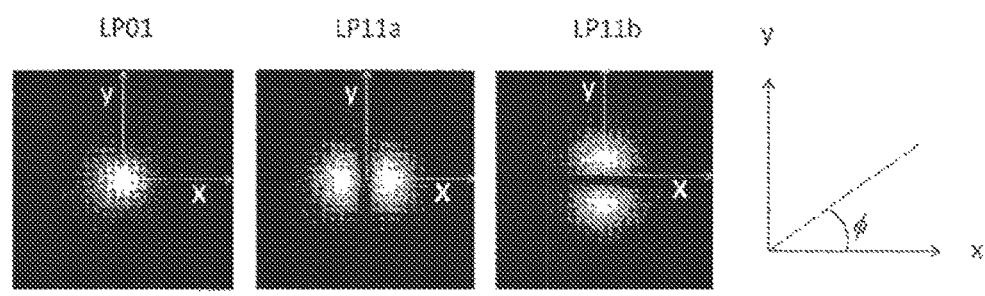
FIG. 3 is a diagram illustrating relationships between light intensity distributions in a fundamental mode and a first higher-order mode, and xy coordinates.

Note that $E_1$ represents an electric field distribution in the fundamental mode (LP01 mode), $E_2$ and $E_3$ represent electric field distributions of two orthogonal first higher-order modes (LP11a and LP11b modes, respectively), w represents a mode field diameter of the fundamental mode and the first higher-order mode, and x and y represent coordinates with the center of an optical fiber cross section being the origin. FIG. 3 is a diagram illustrating relationships between the light intensity distributions in respective modes and the xy coordinates.

An inter-modal coupling efficiency $\eta_{mn}$ of the optical fiber under test in which two of the same type optical fibers are connected is expressed by the following equation.

[Math. M2]

$$\eta_{mn} = \frac{\left|\int\int E_m(x, y) E_n(x - d\cos\theta, y - d\sin\theta) dx dy\right|^2}{\int\int |E_m(x, y)|^2 dx dy \int\int |E_n(x, y)|^2 dx dy} \quad (4)$$

(M2)

$E_m$ and $E_n$ represent an electric field distribution in a mode input to the connection portion and an electric field distribution in a mode output from the connection portion, respectively. That is, $\eta_{mn}$ represents an efficiency of coupling from the mode of m to the mode of n at the connection portion. Additionally, d represents the amount of axial displacement at the connection point, and η represents an angle formed by the x-axis and an axial displacement direction. From Equations (1) to (4), the following equations are obtained.

[Math. M3]

$$\eta_{11} = \exp\left(-\frac{d^2}{w^2}\right) \quad (5)$$

$$\eta_{12} = \eta_{21} = \frac{d^2}{w^2}\cos^2\theta \cdot \exp\left(-\frac{d^2}{w^2}\right) \quad (6)$$

$$\eta_{13} = \eta_{31} = \frac{d^2}{w^2}\sin^2\theta \cdot \exp\left(-\frac{d^2}{w^2}\right) \quad (7)$$

$$\eta_{22} = \left(1 - \frac{d^2}{w^2}\cos^2\theta\right)\exp\left(-\frac{d^2}{w^2}\right) \quad (8)$$

$$\eta_{23} = \eta_{32} = \left(\frac{d^2}{w^2}\sin\theta\cos\theta\right)^2 \exp\left(-\frac{d^2}{w^2}\right) \quad (9)$$

$$\eta_{33} = \left(1 - \frac{d^2}{w^2}\sin^2\theta\right)^2 \exp\left(-\frac{d^2}{w^2}\right) \quad (10)$$

(M3)

Here, two orthogonal first higher-order modes strongly couples during propagation, and so, are difficult to distinguish in actual measurement. Thus, two orthogonal first higher-order modes are collectively considered as a single first higher-order mode group. At this time, Equations (5) to (10) can be expressed as the following equations.

[Math. M4]

$$\eta_{01-01} = \exp\left(-\frac{d^2}{w^2}\right) \quad (11)$$

$$\eta_{01-11} = \eta_{11-01} = \frac{d^2}{w^2}\exp\left(-\frac{d^2}{w^2}\right) \quad (12)$$

$$\eta_{11-11} = \left(1 - \frac{d^2}{w^2} + \frac{1}{2}\frac{d^4}{w^4}\right)\exp\left(-\frac{d^2}{w^2}\right) \quad (13)$$

(M4)

$\eta_{01\text{-}01}$ represents the coupling efficiency between the fundamental modes, $\eta_{01\text{-}11}$ and $\eta_{11\text{-}01}$ represent the coupling efficiencies between the fundamental mode and the first higher-order mode group, and $\eta_{11\text{-}11}$ represents the coupling efficiency between the first higher-order mode groups. This can eliminate the angle $\theta$ that represents the axis displacement direction.

On the other hand, assuming that refractive indices are $n_1$ and $n_2$, and mode field radii are $w_1$ and $w_2$, of the optical fiber under test at an incident end (near end) side and a distal end side of the test light pulse, respectively, when the test light pulse is incident on the optical fiber under test in the fundamental mode, the transmittances at the connection point at the backscattered light intensity of the fundamental mode component and the first higher-order mode component are obtained by the following equations.

[Math. M5]

$$L_1 = \left(\frac{n_2 w_2}{n_1 w_1}\right)^2 (\eta_{01\text{-}01} + \eta_{01\text{-}11})(\eta_{01\text{-}01} + \eta_{11\text{-}01}) \quad (14)$$

$$L_2 = \left(\frac{n_2 w_2}{n_1 w_1}\right)^2 (\eta_{01\text{-}01} + \eta_{01\text{-}11})(\eta_{01\text{-}11} + \eta_{11\text{-}11}) \quad (15)$$

(M5)

$L_1$ and $L_2$ represent the transmittances at the connection point at the backscattered light intensity of the fundamental mode component and the first higher-order mode component, respectively.

Furthermore, when the test light pulse is incident on the optical fiber under test in the first higher-order mode, the transmittances at the connection point at the backscattered light intensity of the fundamental mode component and the first higher-order mode component are obtained by the following equations.

[Math. M6]

$$L_3 = \left(\frac{n_2 w_2}{n_1 w_1}\right)^2 (\eta_{11\text{-}01} + \eta_{11\text{-}11})(\eta_{01\text{-}01} + \eta_{11\text{-}01}) \quad (16)$$

$$L_4 = \left(\frac{n_2 w_2}{n_1 w_1}\right)^2 (\eta_{11\text{-}01} + \eta_{11\text{-}11})(\eta_{01\text{-}11} + \eta_{11\text{-}11}) \quad (17)$$

(M6)

$L_3$ and $L_4$ represent the transmittances at the connection point at the backscattered light intensity of the fundamental mode component and the first higher-order mode component, respectively.

From Equations (14) to (17), by taking a ratio of $L_2$ to $L_1$, or a ratio of $L_4$ to $L_3$, the ratio K of the transmittances can be expressed by the following equation.

[Math. M7]

$$K = \frac{L_2}{L_1} = \frac{L_4}{L_3} = \frac{\eta_{01\text{-}11} + \eta_{11\text{-}11}}{\eta_{01\text{-}01} + \eta_{11\text{-}01}} \quad (18)$$

(M7)

By taking the ratio of the transmittances in this way, a section dependent on the refractive index and mode field radius of the optical fiber under test can be eliminated, so it is possible to reduce (eliminate) the effect of a backscattered light capture rate difference due to unconformities in the refractive index and the mode field diameter between optical fibers that are connected in the optical fiber under test.

From Equations (11) to (13) and (18), the following equation is obtained.

[Math. M8]

$$\left(\frac{d^2}{w^2}\right)^2 - 2K\left(\frac{d^2}{w^2}\right) + 2(1-K) = 0 \quad (19)$$

(M8)

Equation (19) has a multiple root when $(d^2/w^2)$ is $\sqrt{3}-1$, and there are two solutions in other conditions. Normally, in considering that the amount of axial displacement possibly generated at the connection point is 2 μm or less, and the mode field diameter of the optical fiber at the test wavelength is 4.68 μm or more, the solution of Equation (19) is as follows.

[Math. M9]

$$\frac{d^2}{w^2} = K - \sqrt{K^2 + 2K - 2} \quad (20)$$

(M9)

Thus, $(d^2/w^2)$ is computed from the obtained ratio K of the transmittances using Equation (20), and substituted into Equations (11) to (13) so that the inter-modal coupling efficiency can be calculated.

Furthermore, logarithmic transformation is performed on the inter-modal coupling efficiencies computed in accordance with the above scheme so that the mode dependent loss and the inter-modal crosstalk can be computed.

OTHER EMBODIMENTS

Note that the present invention is not limited to the above-described embodiments, and can be variously modified and implemented within the scope not departing from the gist of the present invention. In short, the present invention is not limited to the above-described embodiment as it is, and can be embodied with the components modified within the scope not departing from the gist thereof when implemented. For example, the calculation processing unit D can be realized by a computer and a program, and the program can be recorded on a recording medium or provided through a network. In the examples described above, a fiber in which two of the same type optical fibers are connected in series is described as an optical fiber under test, but the test can be performed using a fiber in which three or more of the same type optical fibers are connected in series as an optical fiber under test.

Furthermore, various inventions can be formed by appropriate combinations of a plurality of components disclosed in the above-described embodiments. For example, several components may be deleted from all of the components illustrated in the embodiments. Furthermore, components of different embodiments may be appropriately combined with each other.

REFERENCE SIGNS LIST

10: Optical fiber under test
11: Light source
12: Pulse generator
13: Light intensity modulator
14: Optical circulator
15: Mode multiplexer/demultiplexer 16, 17: Optical receiver
18: A/D converter
19: Signal processing unit
20: Transmittance ratio computation unit
21: Inter-modal coupling efficiency computation unit
22: Mode dependent loss and inter-modal crosstalk computation unit
101: Optical pulse test apparatus

The invention claimed is:

1. An optical fiber test method comprising:
a light incident procedure that makes a test light pulse of a wavelength capable of propagating in a fundamental mode and a first higher-order mode be incident, in any one of the fundamental mode or the first higher-order mode, on one end of an optical fiber under test in which a plurality of the same type optical fibers are connected in series;
a measurement procedure that measures an intensity distribution for a distance, from the one end, of each of a fundamental mode component and a first higher-order mode component of a return light of the test light pulse made incident in the light incident procedure;
a transmittance ratio computation procedure that computes a ratio K of a transmittance of the first higher-order mode component to a transmittance of the fundamental mode component of the return light at a connection point of the optical fiber under test from the intensity distribution measured in the measurement procedure; and
a calculation procedure in which by using a first mathematical equation and a second mathematical equation in a mathematical equation for finding a coupling efficiency between respective modes at a connection portion of an optical fiber, based on an electric field distribution of each mode in the optical fiber and an amount of axial displacement at the connection portion, the first mathematical equation being obtained by approximating the electric field distributions of the fundamental mode and the first higher-order mode in the optical fiber by Gaussian function and Hermite Gaussian function, the second mathematical equation being obtained by making simultaneous equations of the mathematical equation for finding transmittances of the respective modes from the coupling efficiency between the respective modes and the first mathematical equation, the ratio K of the transmittances computed in the transmittance ratio computation procedure is substituted into the second mathematical equation to calculate the amount of axial displacement, and the amount of axial displacement is substituted into the first mathematical equation to calculate a coupling efficiency $\eta_{01\text{-}01}$ between the fundamental modes, a coupling efficiency $\eta_{01\text{-}11}$ between the fundamental mode and the first higher-order mode group, and a coupling efficiency $\eta_{11\text{-}11}$ between the first high-order mode groups.

2. The optical fiber test method according to claim 1, wherein a following Equation (C1) is used as the second mathematical equation, and a following Equation (C2) is used as the first mathematical equation,

[Math. C1]

$$\frac{d^2}{w^2} = K - \sqrt{K^2 + 2K - 2} \quad \text{(C1)}$$

[Math. C2]

$$\eta_{01\text{-}01} = \exp\left(-\frac{d^2}{w^2}\right) \quad \text{(C2)}$$

$$\eta_{01\text{-}11} = \eta_{11\text{-}01} = \frac{d^2}{w^2}\exp\left(-\frac{d^2}{w^2}\right)$$

$$\eta_{11\text{-}11} = \left(1 - \frac{d^2}{w^2} + \frac{1}{2}\frac{d^4}{w^4}\right)\exp\left(-\frac{d^2}{w^2}\right)$$

where, w represents a mode field diameter of the fundamental mode and the first higher-order mode in the optical fiber under test, and d represents the amount of axial displacement.

3. The optical fiber test method according to claim 1 or 2, wherein in the calculation procedure, further, logarithmic transformation is performed on the coupling efficiency $\eta_{01\text{-}01}$ and the coupling efficiency $\eta_{11\text{-}11}$ to calculate a mode dependent loss and logarithmic transformation is performed on the coupling efficiency $\eta_{01\text{-}11}$ to calculate an inter-modal crosstalk.

4. An optical fiber test apparatus comprising:
a light incident section that makes a test light pulse of a wavelength capable of propagating in a fundamental mode and a first higher-order mode be incident, in any one of the fundamental mode or the first higher-order mode, on one end of an optical fiber under test in which a plurality of the same type optical fibers are connected in series;
a measurement section that measures an intensity distribution for a distance, from the one end, of each of a fundamental mode component and a first higher-order mode component of a return light of the test light pulse made incident by the light incident section;
a transmittance ratio computation section that computes a ratio K of a transmittance of the first higher-order mode component to a transmittance of the fundamental mode component of the return light at a connection point of the optical fiber under test from the intensity distribution measured in the measurement section; and
a calculation section in which by using a first mathematical equation and a second mathematical equation in a mathematical equation for finding a coupling efficiency between respective modes at a connection portion of an optical fiber, based on an electric field distribution of each mode in the optical fiber and an amount of axial displacement at the connection portion, the first mathematical equation being obtained by approximating the electric field distributions of the fundamental mode and the first higher-order mode in the optical fiber by Gaussian function and Hermite Gaussian function, the second mathematical equation being obtained by making simultaneous equations of the mathematical equation for finding transmittances of the respective modes from the coupling efficiency between the respective modes and the first mathematical equation, the ratio K of the transmittances computed in the transmittance ratio computation section is substituted into the second mathematical equation to calculate the amount of axial displacement, and the amount of axial displacement is substituted into the first mathematical equation to calculate a coupling efficiency $\eta_{01\text{-}01}$ between the fundamental modes, a coupling efficiency $\eta_{01\text{-}11}$ between the fundamental mode and the first higher-order mode group, and a coupling efficiency $\eta_{11\text{-}11}$ between the first high-order mode groups.

5. The optical fiber test apparatus according to claim 4, wherein a following Equation (C3) is used as the second mathematical equation, and a following Equation (C4) is used as the first mathematical equation,

[Math. C3]

$$\frac{d^2}{w^2} = K - \sqrt{K^2 + 2K - 2} \tag{C3}$$

[Math. C4]

$$\eta_{01-01} = \exp\left(-\frac{d^2}{w^2}\right)$$
$$\eta_{01-11} = \eta_{11-01} = \frac{d^2}{w^2}\exp\left(-\frac{d^2}{w^2}\right) \tag{C4}$$
$$\eta_{11-11} = \left(1 - \frac{d^2}{w^2} + \frac{1}{2}\frac{d^4}{w^4}\right)\exp\left(-\frac{d^2}{w^2}\right)$$

where, w represents a mode field diameter of the fundamental mode and the first higher-order mode in the optical fiber under test, and d represents the amount of axial displacement.

6. The optical fiber test apparatus according to claim 4, wherein in the calculation section further, logarithmic transformation is performed on the coupling efficiency $\eta_{01-01}$ and the coupling efficiency $\eta_{11-11}$ to calculate a mode dependent loss and logarithmic transformation is performed on the coupling efficiency $\eta_{01-11}$ to calculate an inter-modal crosstalk.

\* \* \* \* \*